United States Patent
Frank et al.

(10) Patent No.: US 11,329,697 B2
(45) Date of Patent: May 10, 2022

(54) MULTI-LAYER ELECTROMAGNETIC COUPLER ARRANGEMENT

(71) Applicant: SATO HOLDINGS KABUSHIKI KAISHA, Tokyo (JP)

(72) Inventors: Markus Frank, Stråvalla (SE); Mats Hedberg, Varberg (SE)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 15/756,287

(22) PCT Filed: Nov. 27, 2015

(86) PCT No.: PCT/EP2015/077931
§ 371 (c)(1),
(2) Date: Feb. 28, 2018

(87) PCT Pub. No.: WO2017/088933
PCT Pub. Date: Jun. 1, 2017

(65) Prior Publication Data
US 2018/0254803 A1    Sep. 6, 2018

(51) Int. Cl.
*H04B 5/00* (2006.01)
*G06K 7/10* (2006.01)
*H02J 50/10* (2016.01)

(52) U.S. Cl.
CPC ....... *H04B 5/0081* (2013.01); *G06K 7/10336* (2013.01); *G06K 7/10356* (2013.01);
(Continued)

(58) Field of Classification Search
None
See application file for complete search history.

(56) References Cited

U.S. PATENT DOCUMENTS

| | | | |
|---|---|---|---|
| 5,734,353 A | | 3/1998 | Van Voorhies |
| 6,133,806 A | * | 10/2000 | Sheen ............ H01P 5/10 333/26 |

(Continued)

FOREIGN PATENT DOCUMENTS

| | | |
|---|---|---|
| CN | 1863681 A | 11/2006 |
| CN | 1914763 A | 2/2007 |

(Continued)

OTHER PUBLICATIONS

International Search Report dated Aug. 10, 2016, issued in counterpart application No. PCT/EP2015/0//931. (2 pages).
(Continued)

*Primary Examiner* — Daniel Kessie
(74) *Attorney, Agent, or Firm* — WHDA, LLP

(57) ABSTRACT

The present invention broadly relates to a multi-layer electromagnetic coupler arrangement, for encoding an RFID tag, suitable for being used in a printing device. The coupler arrangement employs a differential transmission line loop, as a coupling element arranged on a top surface layer of the multi-layer arrangement, which is arranged close to a metallic ground plane layer for shielding on the side opposite the top surface. Coupling is achieved by inductive coupling in the reactive near field and based on the fact that each RFID tag comprises a current loop, itself. The differential property of the transmission line loop is achieved by feeding the terminals of the loop with signal parts having a phase shift of 180° with respect to each other. The feeding components are arranged on the opposite side of the ground plane with respect to the top surface layer comprising the current loop. It is possible to arrange plural differential transmission line loops on the top surface layer, in form of a one-or two-dimensional array.

18 Claims, 4 Drawing Sheets

(52) U.S. Cl.
CPC ............ *H02J 50/10* (2016.02); *H04B 5/0031* (2013.01); *H04B 5/0062* (2013.01)

(56) References Cited

U.S. PATENT DOCUMENTS

| | | | |
|---|---|---|---|
| 7,646,341 B1* | 1/2010 | Lin | H01Q 1/38 343/700 MS |
| 9,880,241 B2* | 1/2018 | Ferrand | G01R 33/341 |
| 2006/0066415 A1* | 3/2006 | Weng | H01P 5/10 333/26 |
| 2007/0229368 A1* | 10/2007 | Hata | H01P 5/10 343/700 MS |
| 2008/0150688 A1* | 6/2008 | Burr | G06K 19/0723 340/10.1 |
| 2009/0073070 A1* | 3/2009 | Rofougaran | H04B 5/0012 343/793 |
| 2010/0079218 A1* | 4/2010 | Albag | H01P 5/10 333/26 |
| 2011/0090054 A1* | 4/2011 | Frank | H01Q 1/2216 340/10.1 |
| 2011/0115611 A1 | 5/2011 | Tsirline et al. | |
| 2015/0097031 A1* | 4/2015 | Yang | G06K 7/10198 235/439 |
| 2015/0130289 A1* | 5/2015 | Hedberg | G06K 19/07786 307/104 |
| 2015/0137885 A1* | 5/2015 | Kingsley | H03F 1/0288 330/124 R |
| 2015/0194736 A1* | 7/2015 | Diukman | H01Q 21/0006 343/818 |

FOREIGN PATENT DOCUMENTS

| | | | | |
|---|---|---|---|---|
| CN | 102024795 A | 4/2011 | | |
| CN | 202257617 U | 5/2012 | | |
| DE | WO2013/174861 | * 11/2013 | ............... | G06K 7/08 |
| JP | 2008-219081 A | 9/2008 | | |
| JP | 2011-53898 A | 3/2011 | | |
| JP | 4674656 B1 | 4/2011 | | |
| JP | 2011-254413 A | 12/2011 | | |
| JP | 2013-15901 A | 1/2013 | | |
| JP | 2013015901 A | 1/2013 | | |
| JP | 2013-511098 A | 3/2013 | | |
| JP | 2015-524191 A | 8/2015 | | |
| WO | 2006/022046 A1 | 3/2006 | | |
| WO | 2013174861 A1 | 11/2013 | | |

OTHER PUBLICATIONS

Written Opinion of the International Searching Authority, issued in counterpart application on. PCT/EP2015/077931 (6 pages).

Office Action dated Apr. 23, 2019, issued in counterpart JP application No. 2018-511235, with English translation (12 pages).

Office Action dated Aug. 31, 2020, issued in counterpart CN Application No. 201580082793.9, with English translation (13 pages).

* cited by examiner

MULTI-LAYER ELECTROMAGNETIC COUPLER ARRANGEMENT

FIELD

The present invention broadly relates to electromagnetic coupling technology. More specifically, a non-limiting embodiment of the present invention relates to an electromagnetic coupler arrangement suitable for use in a printer for coding RFID inlays or other near field encoding applications.

BACKGROUND

Radio frequency identification (RFID) is a technology that uses radio waves to transfer data from electronic tags (known as RFID tags or RFID inlays). The information is stored electronically in the tag. For reading out the information, an RFID reader transmits an encoded radio signal to interrogate the tag. The RFID tag therefore includes an antenna. Further, each RFID tag includes a current loop suitable for inductive coupling. The same antenna and/or the current loop can also be used for encoding the RFID tag by means of electromagnetic coupling.

An RFID device that includes an antenna is usually referred to as an inlay. In particular, an inlay is an RFID device including a flexible metallic antenna film supported on a flexible substrate, which is connected to a transponder. The transponder, included in the current loop, is an integrated circuit for deciphering signals sent to the inlay and received by the antenna and also for sending a signal to the antenna, which is then transmitted by the antenna. The inlay antenna may be tuned (i.e. sized) to communicate at a certain target frequency with a transceiver, which is sometimes referred to as the interrogator. The interrogator typically includes an antenna for communication with the RFID inlay. An inlay may be active or passive. An active inlay would include its own power source such as a battery, while a passive inlay would receive its power from an external source such as an interrogator.

In recent years, printing devices have become known that enable dislocating an RFID inlay on a medium such as a sheet of paper, and at the same time, enable encoding the RFID inlay with the desired information during the printing process. The encoding is performed by means of electromagnetic coupling, preferably in the reactive near field. For this purpose, an RFID printer/encoder is provided with an electromagnetic coupler arrangement that fits in a cavity of the printer so as to couple electromagnetic power bearing the coding information into the RFID inlay which is located on the medium, while the medium is guided through the printer/encoder along a media path.

Conventionally, two types of technologies are used to encode RFID tags (inlays) in reactive near field, which are, in principle, suitable for being fitted into printer cavities:

Static coupler designs employ a rigid electrical RF (radio-frequency) circuit, such as a transmission line circuit on a PCB (printed circuit board). Since the circuit is rigid and inlay geometries generally have very high variability in form factor, the RF coupling behavior between coupler and inlay will also have a high variability. Hence, for each inlay type RF window profiles can be uniquely identified.

Alternatively, adaptive coupler designs with external control (also called semi-adaptive couplers) are known in the art. In this technology, the coupler structure is split up into several "coupling cells" such as an array. Each cell is individually controlled by some external circuit and software. This means that for each type of inlay regardless of its geometry an adaptation can be performed in that only cells for that particular inlay form factor are activated, in order to achieve an optimum coupling. In the ideal case, optimum coupling regardless of inlay form factor can be achieved by having prior knowledge of which cells to activate. In order to get this information about which cells need to be activated, knowledge of the inlay profile is required. Therefore, a scanning process of unknown inlay geometries is necessary. The information obtained by scanning can be stored in a memory so that each inlay type only needs to be scanned once. Nevertheless, for each new inlay type the process has to be repeated. Therefore, an adaptive coupler of said type is not operable as a standalone component but must be accompanied by a software solution containing the necessary algorithms for the scanning process required for external control of the cells to be activated, possibly involving the whole printer system.

The coupling element, whether it is in single configuration making up the whole coupler or in an array configuration, is generally a non-optimized design, since there exists a vast variation of inlay geometries. In many cases, transmission line (TRL) technology is used for leakage field coupling from different TRL geometries. In other cases, more antenna like radiating structure is used, at a cost of extensive shielding for radio frequency (RF) isolation. Regardless of which of the mentioned configurations is used, non-optimized coupling is achieved. One solution for geometry adaptation may then be the array configuration, with controlled excitation of the individual elements for optimized RF coupling field, the imperfection of the individual element is overcome.

As can be seen from the above, it is a drawback of both the above described conventional coupler types that calibrations are needed in order to adapt the coupling arrangement to a particular inlay to be encoded, before an actual encoding can be performed. Either (static coupler) positioning of the inlay for optimum coupling must be known, or (adaptive coupler with external control) the inlay profile formation must be obtained and stored.

In the static case, each inlay type has its own unique required positioning, which cannot be changed for a fixed coupler. The described static designs would therefore not be suitable for certain applications where a desired position cannot be achieved. Also, a case may occur where due to the geometric relations, the coupling performance is too weak to manage any encoding.

In the externally controlled adaptive case, there is a need for a scanning functionality in order to know the inlay profile. Furthermore, if the resolution of the coupling cell array is not high enough, inlay types may still exist which cannot be encoded and the required resolution for any future inlay type may be hard to determine. The adaptive coupler with external control cannot be used in an "empty state" in real time without information on how the cell array needs to be activated for any given inlay type. Furthermore, it cannot be provided as a standalone component which is separated independently from the system it belongs to, but must be integrated with the software and also hardware periphery. Also, the resolution may still be too coarse to manage all inlay types.

SUMMARY

The present invention aims to provide an improved electromagnetic coupler arrangement that is applicable to couple electromagnetic power into inlays of arbitrary shape efficiently without the need for calibration or external control.

This is achieved by the features of claim 1.

According to a first aspect, a multi-layer electromagnetic coupler arrangement for coupling electromagnetic power to an electric current loop of an RFID tag of arbitrary geometric shape, by means of reactive near field coupling, is provided. The multi-layer electromagnetic coupler arrangement comprises a top surface layer forming a top surface of the electromagnetic coupler arrangement to be arranged closest to an RFID tag to which the electromagnetic power is to be coupled. The top surface layer comprises a transmission line loop for achieving the electromagnetic coupling by inductive coupling with a current loop of the RFID tag. The transmission line loop is a continuous transmission line of finite length formed into a loop so that two terminals thereof approach each other. The multi-layer electromagnetic coupler arrangement further comprises a metallic ground plane layer. Further, the multi-layer electromagnetic coupler arrangement comprises a feeding layer. The feeding layer includes a balun element for feeding the two terminals so as to form a differential input of said transmission line loop with current signals obtained by splitting an input signal into two parts equal in amplitude and shifted by 180° in phase with respect to each other. Thereby, a differential transmission line loop is formed out of said transmission line loop. The balun further includes inherent impedance transformation means for matching the impedance of an external feeding system interface with the differential input impedance of the transmission line loop.

It is the approach of a non-limiting embodiment of the present invention to provide an electromagnetic coupler arrangement, which enables direct inductive coupling between a differentially fed transmission line loop (TRL loop) and the current loop of an RFID tag (RFID inlay) to be encoded. Highly efficient reactive near-field coupling is achieved by the differential feeding of the TRL loop. A metallic ground plane layer arranged in near vicinity of the inlay loop and the couple loop acts as an effective two-dimensional shield and prevents radiation of RF energy away. The construction of the coupling element in form of a continuous TRL loop enables an optimization of the geometry thereof, independently from any discrete electronic components for impedance matching. Design flexibility is offered when distributed components may be gathered in one separate subgroup of components, related to a pure field theoretic problem, and discrete components in another, related to a component value problem. In this case this possibility is provided by the ground plane, separating the distributed component side (in the top surface layer) from the discrete component side (below the ground plane, in the feeding layer).

Preferably, the top surface layer and the metallic ground plane layer are realized in microstrip technology. Also preferably, the feeding layer is a microstrip layer. In this respect, microstrip technology has, as compared to strip line technology, the advantage that a lower overall number of layers is required, since a single ground plane layer is sufficient.

According to another preferred non-limiting embodiment, the feeding layer is a strip line layer.

According to preferred non-limiting embodiments, there is a plurality of transmission line loops arranged in a one- or two-dimensional array on the top surface layer. Also preferably, there is provided a separate balun for each of the plural transmission line loops in the feeding layer. According to another preferred non-limiting embodiment, plural of the transmission line loops are fed through a single balun, in which case the plural of loops are arranged and interconnected in such way, as to present a certain impedance towards the output of the balun.

Also preferably, a constant phase magnetic field is formed along the top surface layer. Thereby, in an electromagnetic coupler arrangement having plural transmission line loops (coupling cells) forming an array, arbitrarily shaped inlay structures can be encoded, without the need for an external control by dedicated software and/or hardware. Preferably, in case of a one-dimensional array, said consent phase magnetic field is achieved by means of phase compensation, by including transmission line sections having an electrical length of $\lambda/2$ between each of the transmission line loops, respectively, where $\lambda$ is the guided wavelength of the transmission line. In case of a two-dimensional array, phase compensation between the columns of the array is preferably achieved by means of providing a network (80) of lumped or distributed components in accordance with the selected electrical lengths of transmission line segments between the transmission line loops.

Preferably, the transmission line loop as a super elliptic shape geometry, in accordance with the parametric representation (in Cartesian coordinates x and y):

$$x = a|\cos\theta|^{\frac{2}{m}} sgn(\cos\theta)$$
$$y = b|\cos\theta|^{\frac{2}{m}} sgn(\sin\theta)$$
$$a, b > 0$$
$$m, n \geq 2$$
$$\theta \in [0, 2\pi].$$

Here, parameters a (length) and b (height) determine the size of the loop. Parameters m and n determine the curvature.

Preferably, the input signal is a standard guided wave input signal provided by a 50$\Omega$ (Ohm) coaxial cable system.

Preferably, two dielectric layers are arranged between the top surface layer, the ground plane layer and the feeding layer, respectively, wherein the feeding layer and the top surface layer are connected through vias. Consequently, between each two metallic layers (signal layers) a dielectric substrate material layer is located, electrically isolating the metallic layers.

Preferably, the multi-layer electromagnetic coupler arrangement is used for encoding the RFID tag by coupling electromagnetic power thereto.

Also preferably, the coupler arrangement is employed in a printer, wherein RFID inlays to be encoded are arranged on a medium guided in the printer along a media path. The shape of the multi-layer electromagnetic coupler arrangement preferably can be flexibly adapted so as to achieve a constant distance between the top surface and the media path of the printer at all positions of the top surface.

According to a non-limiting embodiment of the present invention, an RFID printer/encoder comprising a multi-layer electromagnetic coupler arrangement according to the first aspect is provided. Since the electromagnetic coupling for transferring coding information to an RFID inlay occurs in the reactive near field, the multi-layer electromagnetic coupler arrangement can be easily fitted into a printer cavity, in proximity to the media path.

The present invention broadly aims to provide an improved electromagnetic coupler arrangement that is applicable to couple electromagnetic power into inlays of arbitrary shape efficiently without the need for calibration or external control.

These and other aspects and features of non-limiting embodiments will now become apparent to those skilled in the art upon review of the following description of specific non-limiting embodiments in conjunction with the accompanying drawings.

BRIEF DESCRIPTION OF THE DRAWINGS

Additional features and advantages of non-limiting embodiments the present invention will become apparent from the following description as illustrated in the accompanying drawings, wherein.

DETAILED DESCRIPTION

Figure 1:
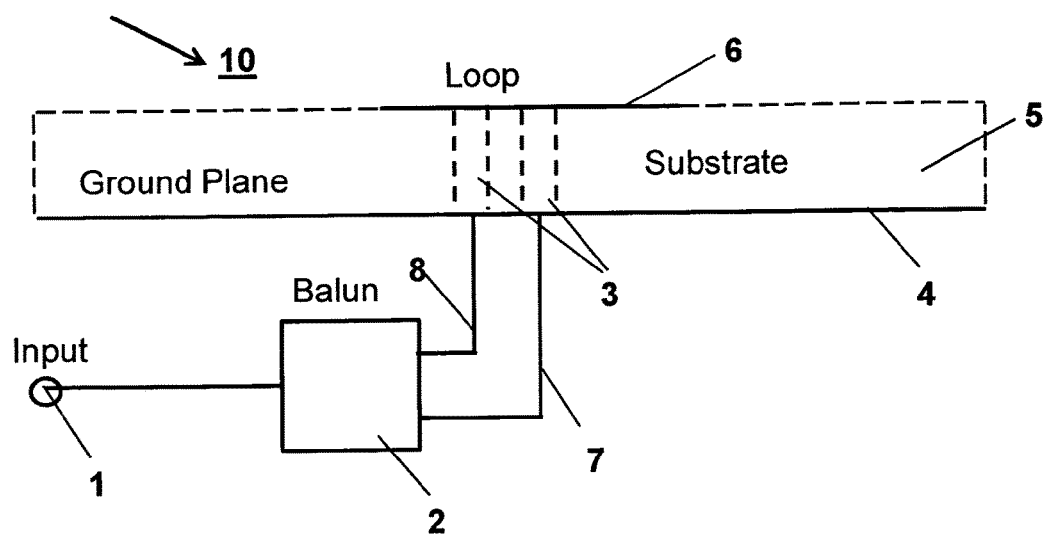
FIG. 1 is a block diagram of a multi-layer electromagnetic coupler arrangement in accordance with non-limiting embodiments of the present invention.

Non-limiting embodiments disclosed herein transform a standard input signal (such as, for instance, in a 50Ω system) into an improved near field without any wave phenomena (propagation) for coupling towards RFID inlays. The coupling in accordance with non-limiting embodiments of the present invention is basically magnetic (inductive) coupling. Since the inlay is a far field tuned device for propagation at large distances (or at least for the radiating near field), a non-limiting embodiment of the present invention has been made so as to limit radiation based coupling and instead couple energy and information from the coupler to the inlay (more specifically, the transponder chip of the inlay) in reactive near field. Consequently, the inlay is not regarded as a field radiating device any longer but rather as a component in a signal transfer chain with the transponder chip of the inlay as the receiver. A non-limiting embodiment of the present invention thus limits destructive cavity interference due to radiation and radio frequency (RF) isolation problems with neighbors adjacent to the inlay to be encoded which are strict requirements in an RFID enabled printer.

An element (actually: the coupling element) of the multi-layer electromagnetic coupler arrangement according to non-limiting embodiments of the present invention is a differential transmission line loop (in the following abbreviated as differential TRL loop or DTLL). The differential transmission line loop is a combination of a finite length transmission line (TRL) formed into a loop geometry with the input and output terminals being adjacent (in close proximity) and a differential feeding signal. The differential feeding signal is generated by a device splitting an input signal into two equal parts in amplitude but with a phase shift of 180° in time. This device is known as a balun (wherein the word "balun" has the meaning of "balanced to unbalanced"). The signal parts feed one terminal of the DTLL each. Thus the two terminals of the TRL can be considered as a single differential port.

The purpose of the loop is to couple RF energy by means of reactive near field magnetic induction towards the inductive loop of an RFID inlay, or more generally tag. Thus, the loop is located on an exposed top surface layer of a substrate. A distributed ground reference in the form of a ground plane (metallic plane connected to ground) is an intermediate layer on the opposite side of the substrate.

The balun may be realized in many ways. One example is a lumped component topology. Regardless of the realization a suitable location is on the opposite side of the ground plane relative to the top side where the loop is located. A connection between the differential output of the balun and at the differential input of the loop is preferably established through vias connecting the balun layer with the loop layer.

Whereas the loop layer, ground plane and a substrate in between these two are constituted in microstrip technology, the opposing layer or layers on the other side of the ground plane may be constituted, but are not limited to, microstrip technology. The only common requirement is the generation of a differential signal.

FIG. 1 is a simplified block diagram illustrating an electromagnetic coupler arrangement 10 according to a non-limiting embodiment of the present invention, including a DTLL.

The arrangement comprises an input terminal 1, a balun 2, a ground plane 4, a substrate 5 and a TRL loop 6. The loop 6 is arranged on the top surface layer. Substrate 5 is arranged between the top surface layer and ground plane 4.

An input signal such from a default 50Ω coaxial cable system is input at input terminal 1. Balun 2 splits the input signal into two signals 7 and 8 that are fed into the two terminals (not illustrated) of the TRL loop 6. Specifically, balun 2 operates so as to split the input signal into two signals that are of the same amplitude and have a phase shift of 180° with respect to each other. Such a combination of signals (7, 8) is regarded as a "differential signal". For feeding signals 7 and 8, through ground plane 4 and substrate 5, to loop 6, vias 3 are foreseen.

Ground plane 4 is configured to provide shielding properties that serve, on the one hand, for concentrating the energy in the loop and avoiding radiation losses, and on the other hand, for shielding the coupler arrangement in such a way that neighboring inlays (such as an inlay preceding an inlay to be currently encoded and an inlay following the currently encoded inlay on a paper strip guided along the media path through the cavity of the printer) are not coupled at the same time.

Further, in accordance with non-limiting embodiments of the present invention, the balun includes electric elements for matching an output impedance thereof with an impedance of an external feeding system interface and compensating for the inductance of the transmission line loop.

Figure 2:
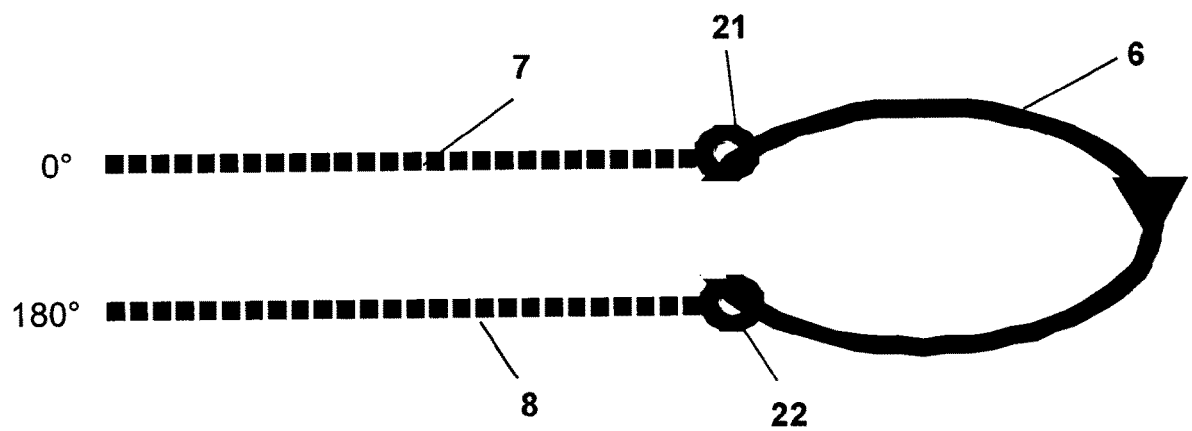
FIG. 2 is a simplified functional illustration of a differential transmission line loop as employed in non-limiting embodiments of the present invention.

FIG. 2 is a simplified functional illustration of the differential transmission line loop, that is, the coupling element of a non-limiting embodiment of the present invention taken alone. The coupling element is constituted of a continuous transmission line (in the microstrip technology), which is shaped so as to form an (almost) closed loop 6. The open ends of the loop 6 constitute terminals 21 and 22 that are fed with signals 7 and 8 (illustrated in form of dashed lines), having a phase difference of 180° with respect to each other. As was explained above with reference to FIG. 1, signals 7 and 8 are output by a balun, as a result of splitting an input signal into two signals of equal amplitude and inverted phase.

As a consequence of the differential feeding, the direction of the current flowing in the loop 6, illustrated by an arrow in the loop, can be the same throughout the loop (at a given instance of time).

The design of the coupling element as a continuous transmission line loop, representing a distributed field theoretic component, can be performed without the consideration of matching. On the contrary if discrete components were to be included at intermediate locations in the loop structure, for the purpose of input matching, unnecessary iteration would be needed between field theoretic coupling optimization and component value optimization. Thus a continuous transmission line loop offers a considerable design advantage as compared to mixing distributed and discrete components inside the coupling structure. In accordance with a non-limiting embodiment of the present invention, all discrete components are arranged on the feeding side, or balun side of the arrangement, that is, the opposite side of the ground plane relative to the coupling element.

Hence, a non-limiting embodiment of the present invention facilitates firstly (and independently) optimizing the geometry of the transmission line loop and secondly, after geometry of the transmission line loop has been optimized, performing the impedance matching on the balun side, by choosing appropriate electric components. The balun has three functional properties. The first property consists of splitting the input signal into two parts equal in magnitude. The second property consists of shifting the two parts 180° apart in phase. The third property consists of an impedance transformation from a non-differential impedance of an external feeding system interface, like e.g. 50Ω, to a differential impedance level, as seen at the input of the loop. In other words, the balun according to a non-limiting embodiment of the present invention may be regarded as including a transformer and designated as a "balun transformer" since it also fulfils the third function of impedance transformation. The impedance transformation is generally characterized by the impedance transmission ratio k. In the case relevant for a non-limiting embodiment of the present invention, wherein a non-differential impedance is transformed into a differential impedance, k equals twice the ratio of the differential impedance value (at the input of the DTLL) and the non-differential impedance value (of the external feeding system interface). In case of a 50Ω external feeding system, and assuming the differential impedance level at the input of the loop to be 500Ω, the impedance transmission ratio would be k=5.

Generally, the balun "sees", at its output, a high reactive impedance (or high Q-value), which is due to the inductive character of the TRL loop and the presence of the ground plane. By including the respective electric components, said impedance is matched with the impedance on the feeding side.

A high Q-value (high value of the Q-factor or quality factor) corresponds to a highly efficient inductive coupling but at a reduced bandwidth, since the Q-factor generally expresses the relation of the resonance frequency of a circuit to the bandwidth (half power bandwidth). This means that the range of frequencies where it is possible to deliver power with high efficiency is limited. Therefore, the matching is preferably made in a manner so as to reduce the Q-value to a certain acceptable extent. This can be done, for instance, by including an internal resistor, at the output of the balun. This is possible, taking into account the potentially very high coupling factors that can be achieved between the differentially fed transmission line loop and the inductive loop of an inlay at a single frequency, where some reduction in delivered power to the transponder chip is accepted, with still an overall high coupling factor exhibited by the DTLL over the desired bandwidth.

Figure 3:
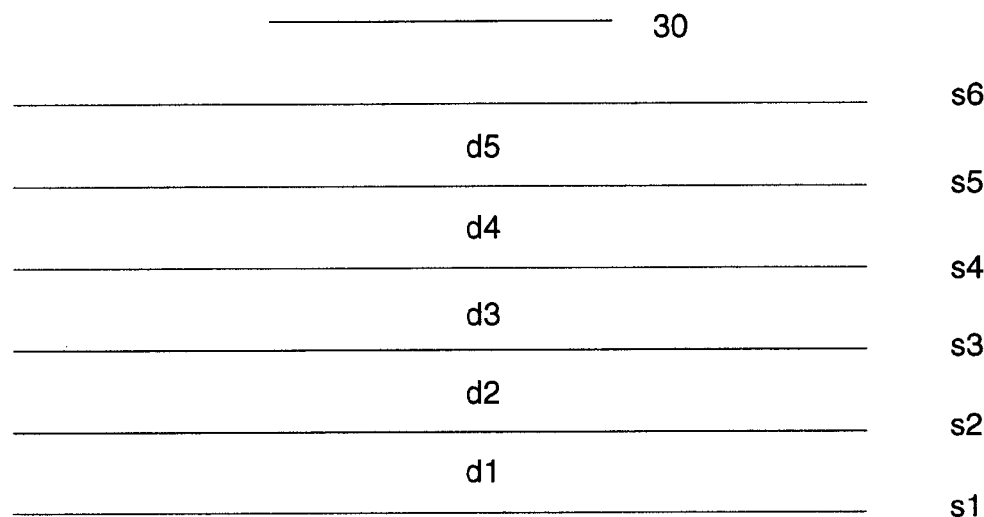
FIG. 3 is an illustration of an exemplary layer structure of a multi-layer electromagnetic coupler arrangement together with an inlay to be encoded, according to a non-limiting embodiment of the present invention.

FIG. 3 is a more general illustration of a layered structure of a multi-layer electromagnetic coupling arrangement in accordance with a non-limiting embodiment of the present invention.

As can be seen therefrom, although there are three (metallic) layers (that is, the top surface layer, the ground layer and the feeding layer), non-limiting embodiments of the present invention can include more than three layers.

Referring to the non-limiting embodiment illustrated in FIG. 3, there is a multi-layer structure having six metallic signal layers (s1, s2, s3, s4, s5, s6). A plurality of five dielectric substrate layers (d1, d2, d3, d4, d5) is arranged between two neighboring metallic layers each, so as to be "sandwiched" by the neighboring metallic layers. Thereby, the signal layers are electrically isolated.

The multilayer structure includes a bottom and a top surface, formed by metallic layers s1 and s6, respectively. In the illustrated structure, layer s6 corresponds to the top surface layer including the differential TRL loop. FIG. 3 further shows an RFID tag 30 to be encoded, which is arranged in close proximity to top surface layer s6. In other words, in a printer, the top surface layer s6 is located close to the media path of the printer, along which RFID tags to be encoded are guided. Generally, the multi-layer structure may be planar, or, in a more advanced mechanical configuration, curved, parallel and conforming to the media path.

Dielectric layers d1, d2, d3 and d4 are of the same type, whereas d5 may be of a different type in terms of dielectric properties and thickness. Since dielectric properties and thickness of d5 influences the coupling properties, together with the loop geometry, the determination thereof forms a part of the optimization. The stack-up of the different layers, that is, the distance between the different layers, at any position on the surface is constant. Further, the distance between the bottom and top surface is very small compared to the free space RF wavelength in a homogeneous medium, having the same dielectric characteristics as the dielectric layer having the highest directly constant.

In the illustrated non-limiting embodiment, layers s1, s3 and s5 are ground plane layers. Layers s2 and s4 are stripline layers, which serve for the feeding. s6 is a microstrip layer, that is, the coupling layer (including the DTLL).

More specifically, in the illustrated non-limiting embodiment, s2 and s4 constitute a balanced feeding network realized in strip line technology, which is used for the feeding of balanced components located on s1 and s6. s6 only comprises distributed components realized in microstrip technology.

In a non-limiting embodiment having only three metallic signal layers, the top surface layer, the ground layer and the feeding layer correspond to layers s6, s5 and s4 of FIG. 3, respectively.

The differential transmission line loop will present a frequency dependent inductance given as $$Z_{loop} = jZ_{C,loop}\frac{2\sin\theta}{1+\cos\theta},$$

where $Z_{C,loop}$ is the characteristic impedance of the TRL. $\theta$ is the electrical length given as $$\theta = \frac{2\pi}{c}\sqrt{\varepsilon_{\mathit{eff}}}\,fL,$$

where c is the speed of light, $\varepsilon_{\mathit{eff}}$ is the effective dielectric constant of the TRL, f the operating frequency and L the physical length of the loop. The width and physical length of the loop will then determine the presented inductance at the given operating frequency.

Seen from an electric circuit perspective an RFID inlay always comprises an electric current loop, although the geometrical shape of this current loop may be very different. This loop is also known as the inductive loop of the inlay (inlay loop), which is a reactive near field component integrated with a radiator, which is the far field radiating component. The existence of a current loop is realized by the fact that the transponder chip of the inlay is highly capacitive and an inductance is needed for efficient coupling of RF power. A current loop can be equivalently seen as a presented inductance. Inside the current loop a magnetic field resides and by locating a differential TRL loop close to this field, mutual coupling will be exhibited between the TRL loop (coupler loop) and the current loop of the inlay. Thus a highly efficient reactive near field coupling circuit is created. The high efficiency in coupling is mainly achieved through the differential feeding of the TRL loop.

At the same time as high reactive near field coupling is achieved, it needs to be ensured that the inlay does not radiate RF energy away, which may interact with neighboring inlays located in close vicinity to the targeted inlay. Ground plane layer s5 will therefore act as an effective two dimensional shield.

Since the ground plane is considered to have a surface large enough to cover the near field interaction between the coupler loop and the inlay loop, the coupler loop and its interaction with an inlay can be treated as a separate circuit, independent of the differential feeding device, which can be regarded as shielded off, due to the ground plane. The interaction between the coupler loop and the inlay loop depends greatly on the geometry of the two. It has to be noted that the inlay loop is also a differential device, due to the antenna nature of the inlay, located in free space. However, since the ground plane is located in close vicinity to the inlay and the coupler loop, radiation may be considered as negligible. Thus, a non-limiting embodiment of the present invention provides a reactive near field coupling structure.

Details regarding loop geometry and optimizations/improvements thereof in accordance with non-limiting embodiments of the invention will now be described in connection with FIGS. 4 and 5.

Figure 4:
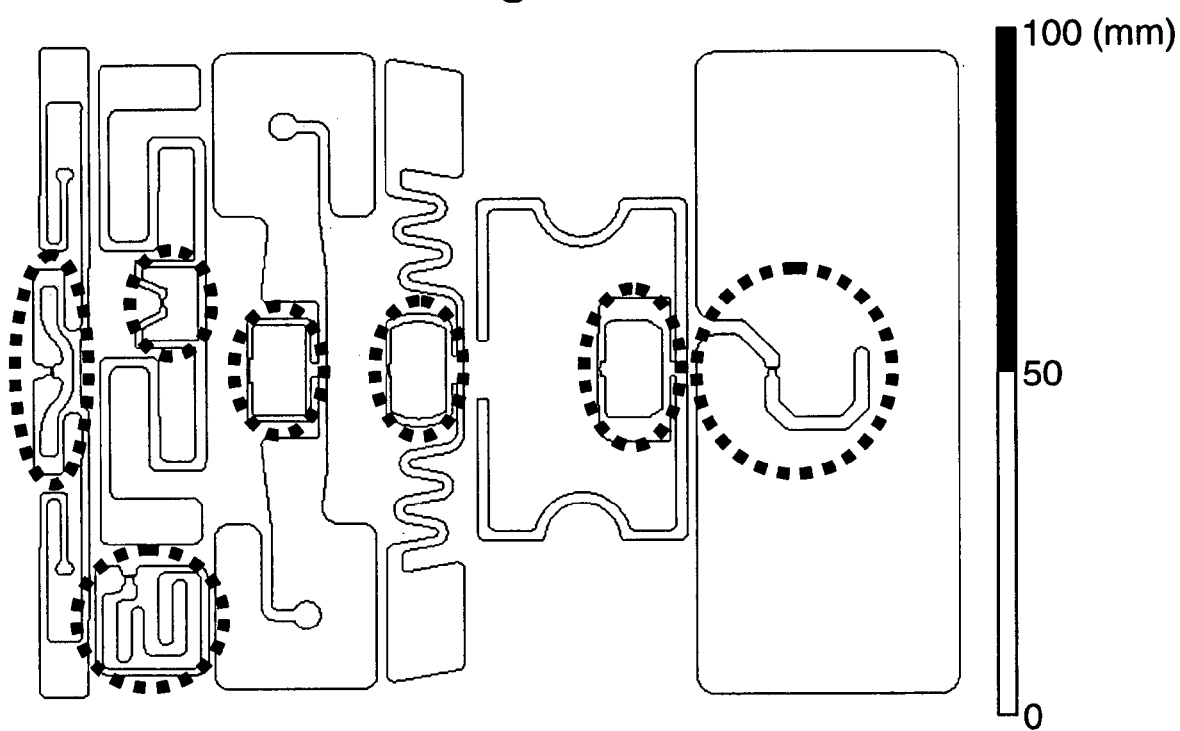
FIG. 4 illustrates examples of inlay geometries.

FIG. 4 illustrates examples of inlay geometries. As already explained before, all of the illustrated inlay geometries have the common feature of including inductive loops, which are respectively indicated in the figure by means of dotted closed lines.

The couple loop geometry may be constructed so as to fulfill efficient coupling properties towards a large variety of inlay geometries. A common feature for all RFID inlays is the existence of the inductive current inlay loop.

Since all inlays include an inductive loop, a fixed coupler loop geometry may achieve efficient coupling towards any possible inlay loop geometry. Of course the level of coupling will differ, depending on inlay loop geometry for the fixed coupler geometry, but the high sensitivity of the transponder chip leaves margin for these differences. Thus, "efficient" should be understood as an interval with margin to the threshold level, where the differential signaling is also an important part resulting in stronger coupling levels than in the non-differentially fed couplers.

Figure 5:
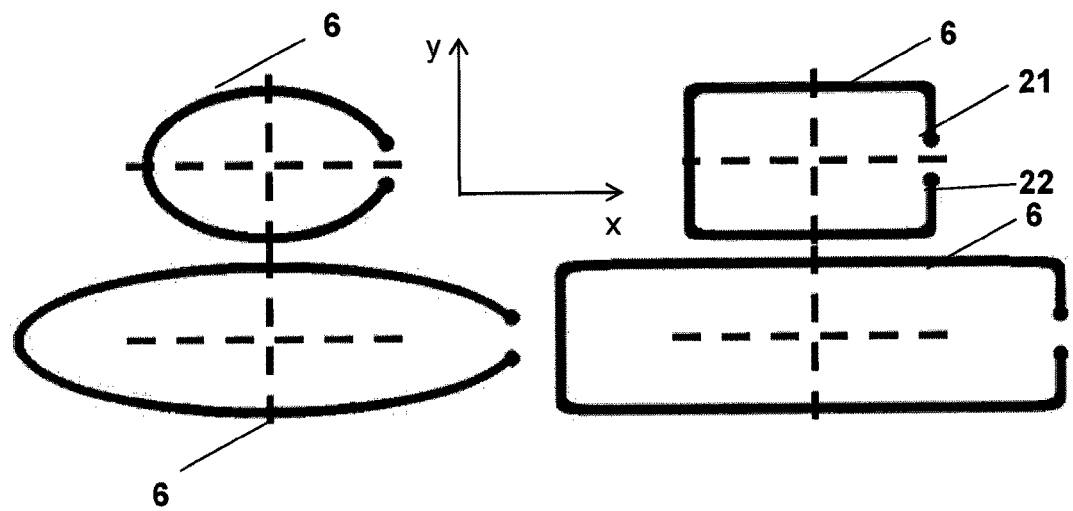
FIG. 5 illustrates a plurality of exemplary loop geometries that are based on the super ellipse equation.

As specific examples of coupler loop geometries, a plurality of coupler loops having super elliptical shapes with different parameters are illustrated in FIG. 5. Super elliptical shapes suitable for non-limiting embodiments of the present invention are parametrically defined in Cartesian coordinates x and y in accordance with the equations $$x = a|\cos\theta|^{\frac{2}{m}}sgn(\cos\theta)$$
$$y = b|\cos\theta|^{\frac{2}{m}}sgn(\sin\theta)$$
$$a, b > 0$$
$$m, n \geq 2$$
$$\theta \in [0, 2\pi].$$

In these equations, parameters a (length) and b (height) are of a length dimension and define the size of the super ellipse in the x and y-dimensions, respectively (thus being a generalization of the half axes of an ordinary ellipse) while parameters n and m define the curvature, i.e. the deviation from an ordinary ellipse (n=m=2) towards a rectangular shape (for n, m>2). $\theta$ is the variable parameter of the parametric representation of the curve.

In FIG. 5, for a, parameter values of a=7.5 mm (millimeters) (upper examples) and a=15.5 mm (lower examples) have been illustrated. b has been set fixed to b=4.6 mm in all examples. For n and m, values of n=m=2 (left-hand side examples) and n=m=20 (right-hand side examples) were used. The dashed lines indicate the symmetry axes. The dual symmetry axis is common for the super elliptical shape.

From an electrical TRL perspective, due to the strongly constrained electromagnetic field, the couple loop input at the terminals is well approximated by a function which only depends on the length and trace width of the loop, and not the shape. Thus, there are many other asymmetrical shapes not covered by this particular geometric form, which are possible candidates for efficient reactive near field coupling, and the loop is not limited to the particular geometric shape illustrated in FIG. 5.

As simulations show, if the length dimension of the loop (x-axis of FIG. 5) becomes large such that the TRL loop of the coupler also covers the inlay antenna (radiator) of an RFID tag brought into close vicinity of the coupler, besides the coupling with the current loop of the inlay, also coupling with the inlay antenna becomes important. This may lead to destructive interference.

The top surface layer (layer s6 of FIG. 3) is not limited to including a single loop element, but the top surface layer (layer s6 of FIG. 3) may also be configured so as to include a plurality of differential transmission line loops arranged in a one-dimensional or two-dimensional array. In case of an array arrangement, a constant phase magnetic field distribution throughout the loops can be achieved, whereby arbitrarily shaped inlay structures can be encoded, without the need for external control.

Figure 6:
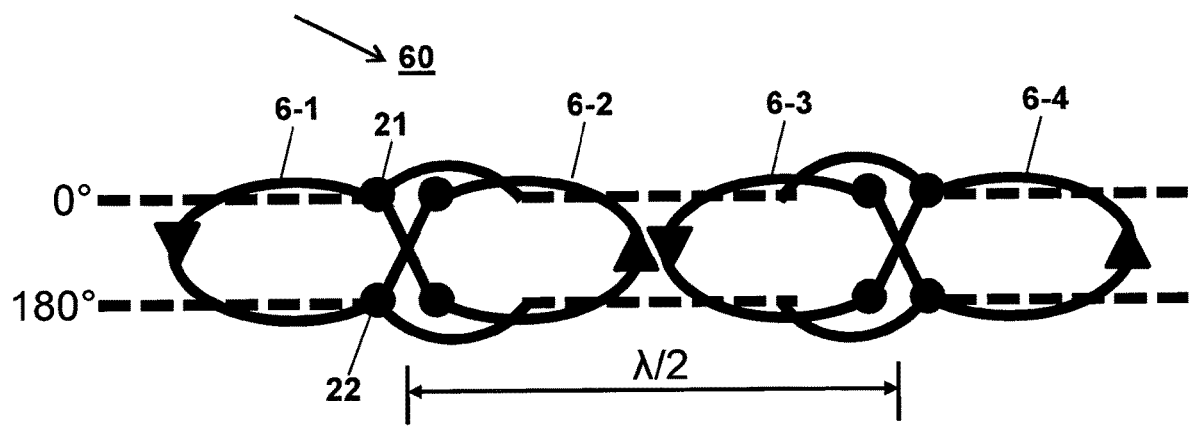
FIG. 6 illustrates an example of a one-dimensional array of differential transmission line loops in accordance with non-limiting embodiments of the present invention.

A non-limiting embodiment including a one-dimensional array 60 of differential TRL loops 6-1, 6-2, 6-3 and 6-4 is illustrated in FIG. 6. In the illustrated non-limiting embodiment, phase compensation in the one-dimensional arrangement is achieved by the use of half wave sections ($\lambda/2$, wherein $\lambda$ is the guided wavelength of the transmission line) between the loops in combination with the switch of the connection points, as shown in FIG. 6 by means of the "X"—like portions (crossing lines) between the terminals of two neighboring loops.

Since the input impedance seen by a load having the impedance $Z_l$, connected to a TRL with characteristic impedance $Z_C$, physical length L and electrical length $\theta=(2\pi/\lambda)*L$ is given by $$Z_{in} = Z_C \frac{Z_l + jZ_C\tan\theta}{Z_C + jZ_l\tan\theta},$$

including $\lambda/2$ ($\theta=180°$) sections will virtually parallel connect the loops. However, the phase of the current switches by 180°. The shift of connection points is then needed between adjacent loops, as indicated by the crossing lines in FIG. 6. This is possible since the feeding arrangement (such as by striplines) is located in a different layer. Note that the connection points are at every second loop.

In the non-limiting embodiment, the balun conversion is achieved at one end of the array (indicated by the values 0° and 180°, respectively) and the other end of the array may be terminated by a suitable load. There are several possibilities of balun conversion, such as lumped component realizations and compact distributed realizations.

Figure 7:
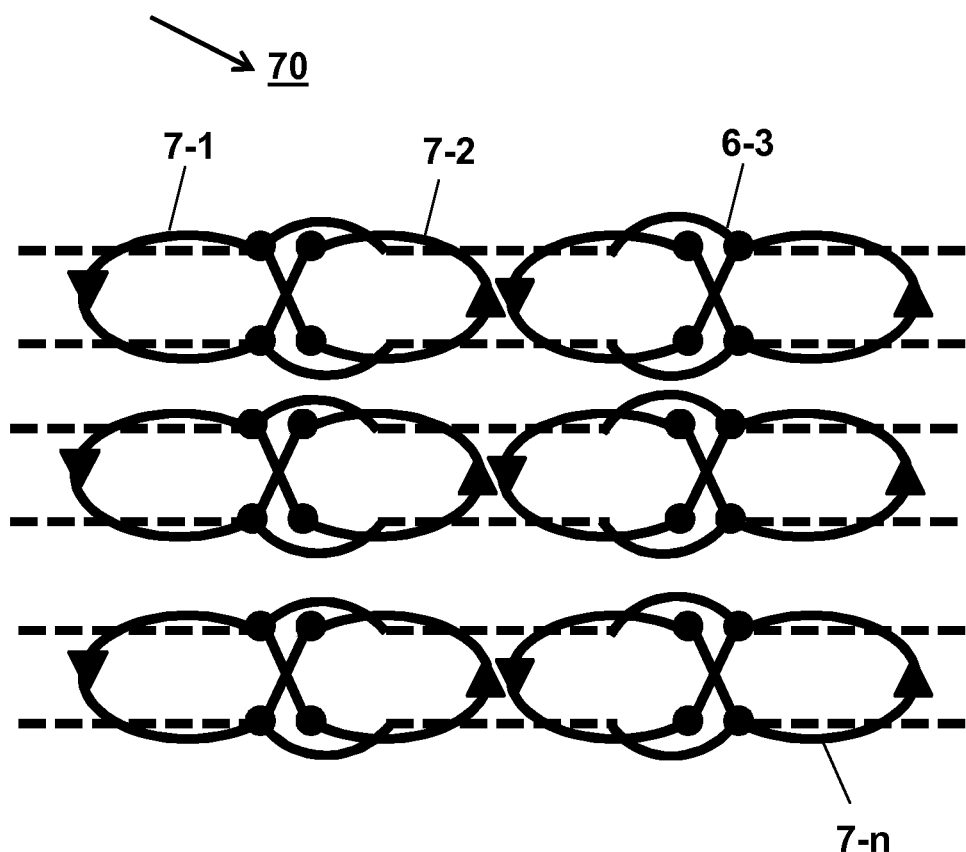
FIG. 7 illustrates an example of a two-dimensional array of differential transmission line loops in accordance with non-limiting embodiments of the present invention.

Another non-limiting embodiment including an extension to a two-dimensional array 70 of differential TRL loops 7-1, 7-2, . . . , 7-n is illustrated in FIG. 7. As can be seen from FIG. 7, one-dimensional arrays as illustrated in FIG. 6 are positioned in lines next to each other.

Figure 8:
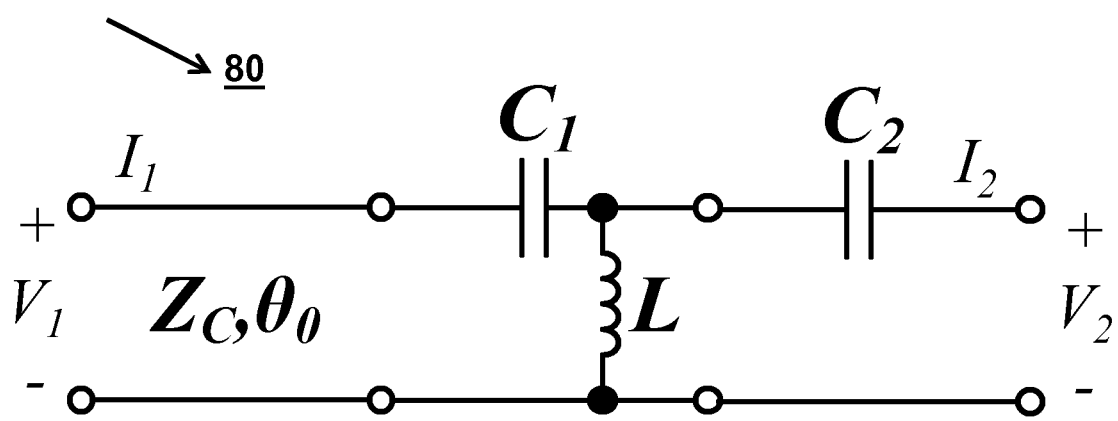
FIG. 8 illustrates an exemplary arrangement for realizing a phase compensation between the columns of a two-dimensional array.

A phase compensation between the lines of the two-dimensional array may be realized in lumped component technology such as in the non-limiting embodiment illustrated in FIG. 8 showing a segment connecting to adjacent lines of the array of FIG. 7 and converting an input voltage and current ($V_1$, $I_1$) into an output voltage and current ($V_2$, $I_2$).

The phase compensation is needed for the segments connecting the loop lines. In FIG. 8, a combination of a TRL segment indicated by characteristic values $Z_C$ and $\theta_0$ (left-hand side of the figure) and an arrangement of two capacitors $C_1$ and $C_2$ together with an inductor L (right-hand side of the figure) is schematically shown. The characteristic values $Z_C$ and $\theta_0$ correspond to the electrical length of the TRL segment. $Z_C$ is the characteristic impedance of the TRL segment and $\theta_0$ is the phase angle change corresponding to the center frequency of the applied electric signal.

The component values are given as $$L = \frac{Z_C}{\omega_0 \sin\theta_0}$$

$$C_1 = C_2 = \frac{\sin\theta_0}{\omega_0 Z_C (1 - \cos\theta_0)},$$

wherein $\omega_0$ is the center frequency of the applied electric signal.

In a further extension towards a more self adaptive concept, the mutual coupling between a loop element and the inlay inductive loop may be used to trigger a switch to activate the loop in question and at the same time keep the remaining loops disconnected or inactive. This is achieved by the fact that independent of the orientation and position of the inlay, as long as it is located above the array, there will always be one or at most two loops which exhibit stronger coupling due to the near vicinity of the inductive loop than the others. This may be used as a trigger signal to a control circuitry driving the switching network. Note that this would be a direct current (DC) static technology superimposed on the high frequency coupling circuitry, thus being independent. It requires a DC biasing of the coupler structure. However, except for this additional biasing the function of the coupler would remain independent of hardware and software in the printer in which it is built in.

In summary, the present invention broadly relates to a multi-layer electromagnetic coupler arrangement, for encoding an RFID tag, suitable for being used in a printing device. The coupler arrangement employs a differential transmission line loop, as a coupling element arranged on a top surface layer of the multi-layer arrangement, which is arranged close to a metallic ground plane layer for shielding on the side opposite the top surface. Coupling is achieved by inductive coupling in the reactive near field and based on the fact that each RFID tag comprises a current loop, itself. The differential property of the transmission line loop is achieved by feeding the terminals of the loop with signal parts having a phase shift of 180° with respect to each other. The feeding components are arranged on the opposite side of the ground plane with respect to the top surface layer comprising the current loop. It is possible to arrange plural differential transmission line loops on the top surface layer, in form of a one-or two-dimensional array.

It is noted that the foregoing has outlined some of the more pertinent non-limiting embodiments. It will be clear to those skilled in the art that modifications to the disclosed non-limiting embodiments can be effected without departing from the spirit and scope thereof. As such, the described non-limiting embodiments ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiments is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

The invention claimed is:

1. A multi-layer electromagnetic coupler arrangement for coupling electromagnetic power to an electric current loop of an RFID tag of arbitrary geometric shape, by means of reactive near field coupling, the electromagnetic coupler arrangement comprising:

a top surface layer forming a top surface of the electromagnetic coupler arrangement to be arranged closest to an RFID tag to which the electromagnetic power is to be coupled, the top surface layer comprising a transmission line loop for achieving the electromagnetic coupling by inductive coupling with a current loop of the RFID tag, the transmission line loop being a continuous transmission line of finite length formed into a loop so that two terminals thereof approach each other;

a metallic ground plane layer; and a feeding layer including a balun element for feeding the two terminals so as to form a differential input of said transmission line loop with current signals obtained by splitting an input signal into two parts equal in amplitude and shifted by 180° in phase with respect to each other, thereby forming a differential transmission line loop out of said transmission line loop, the balun further including inherent impedance transformation means for matching the impedance of an external feeding system interface with the differential input impedance of the transmission line loop.

2. The multi-layer electromagnetic coupler arrangement according to claim 1, wherein said top surface layer and said metallic ground plane layer are realized in microstrip technology.

3. The multi-layer electromagnetic coupler arrangement according to claim 1, wherein said feeding layer is a microstrip layer.

4. The multi-layer electromagnetic coupler arrangement according to claim 1, wherein said feeding layer is a stripline layer.

5. The multi-layer electromagnetic coupler arrangement according to claim 1, comprising a plurality of transmission line loops arranged in a one-or two-dimensional array on said top surface layer.

6. The multi-layer electromagnetic coupler arrangement according to claim 5, wherein there is provided a separate balun for each of said plural transmission line loops, in said feeding layer.

7. The multi-layer electromagnetic coupler arrangement according to claim 5, wherein plural of said transmission line loops are fed through a single balun, in said feeding layer.

8. The multi-layer electromagnetic coupler arrangement according to claim 5, wherein there is formed a constant phase magnetic field along said top surface layer.

9. The multi-layer electromagnetic coupler arrangement according to claim 8, wherein said array being a one-dimensional array and said constant phase magnetic field is achieved by means of phase compensation, by including transmission line sections having an electrical length of $\lambda/2$ between each two of said transmission line loops, respectively, wherein $\lambda$ is the guided wavelength of the transmission line.

10. The multi-layer electromagnetic coupler arrangement according to claim 8, wherein said one-or two-dimensional array is a two-dimensional array and phase compensation between the columns of said array is achieved by means of providing a network of lumped or distributed components in accordance with selected electrical lengths of transmission line segments between said transmission line loops.

11. The multi-layer electromagnetic coupler arrangement according to claim 1, wherein said transmission line loop has a super elliptic shape geometry in accordance with the parametric representation:

$$x = a|\cos\theta|^{\frac{2}{m}} sgn(\cos\theta)$$
$$y = b|\cos\theta|^{\frac{2}{m}} sgn(\sin\theta)$$
$$a, b > 0$$
$$m, n \geq 2$$
$$\theta \in [0, 2\pi],$$

wherein x and y are Cartesian co-ordinates.

12. The multi-layer electromagnetic coupler arrangement according to claim 1, wherein the input signal is a standard guided wave input signal provided by a 50Ω coaxial cable system.

13. The multi-layer electromagnetic coupler arrangement according to claim 1, further comprising two dielectric layers arranged between said top surface layer, said ground plane layer, and said feeding layer, respectively, wherein the feeding layer and the top surface layer are connected through vias.

14. The multi-layer electromagnetic coupler arrangement according to claim 1, adapted to encode said RFID tag by coupling electromagnetic power thereto.

15. The multi-layer electromagnetic coupler arrangement according to claim 14 suitable for being employed in a printer wherein RFID tags to be encoded are arranged on a medium guided in the printer along a media path, wherein the shape of the multi-layer electromagnetic coupler arrangement can be flexibly adapted so as to achieve a constant distance between the top surface and the media path of the printer at all positions of the top surface.

16. An RFID printer/encoder comprising a multi-layer electromagnetic coupler arrangement according to claim 14.

17. The multi-layer electromagnetic coupler arrangement according to claim 1, a plurality of transmission line loops are arranged in a one-dimensional array on said top surface layer, wherein there is formed a constant phase magnetic field along said top surface layer, and wherein said constant phase magnetic field is achieved by means of phase compensation, by including transmission line sections having an electrical length of $\lambda/2$ between each two of said transmission line loops, respectively, wherein $\lambda$ is the guided wavelength of the transmission line in combination with switch of connection points to the feeding layer at every second transmission line loop.

18. The multi-layer electromagnetic coupler arrangement according to claim 17, comprising:

a plurality of said one-dimensional arrays so as to form a two-dimensional array of transmission line loops, and wherein phase compensation between the columns of said array is achieved by means of providing a network of lumped or distributed components in accordance with selected electrical lengths of transmission line segments between said transmission line loops.

* * * * *